United States Patent
Tang (10) Patent No.: US 8,803,386 B2
(45) Date of Patent: Aug. 12, 2014

(54) BRUSHLESS DC MOTOR HAVING STRUCTURES FOR MOUNTING A HALL ELEMENT AND A MAGNETIC RING OUTSIDE A MOTOR CASING

(75) Inventor: Songfa Tang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 331 days.

(21) Appl. No.: 13/344,598

(22) Filed: Jan. 5, 2012

(65) Prior Publication Data
US 2012/0104906 A1    May 3, 2012

Related U.S. Application Data

(63) Continuation-in-part of application No. 13/283,631, filed on Oct. 28, 2011, now Pat. No. 8,476,796.

(30) Foreign Application Priority Data

Oct. 30, 2010   (CN) ...................... 2010 2 0595366 U (51) Int. Cl.
*H02K 11/00* (2006.01)
*G01B 7/30* (2006.01)
(52) U.S. Cl.
USPC ...... 310/68 B; 310/68 E; 310/71; 324/207.25
(58) Field of Classification Search
CPC ........... H02K 11/00; H02K 29/08; G01B 7/30
USPC ..................... 310/68 B, 68 E, 71; 324/207.25
See application file for complete search history.

(56) References Cited

U.S. PATENT DOCUMENTS

2008/0174213 A1 * 7/2008 Peterson et al. ............. 310/68 R
2008/0211332 A1 * 9/2008 Kataoka et al. ................. 310/71

FOREIGN PATENT DOCUMENTS

JP          2008312356 A  * 12/2008
WO     WO 2007104894 A1 *  9/2007
WO     WO 2009150772 A1 * 12/2009

OTHER PUBLICATIONS

Machine Translation JP2008312356 (2008).*

* cited by examiner

*Primary Examiner* — Tran Nguyen
*Assistant Examiner* — Jose Gonzalez Quinone
(74) *Attorney, Agent, or Firm* — Matthias Scholl P.C.; Matthias Scholl (57) ABSTRACT

A brushless DC motor including a motor casing, a stator component, and a rotor component. The stator component and the rotor component are respectively arranged inside the motor casing. The rotor component includes a rotor iron core and a rotating shaft supporting the rotor iron core. A shaft extension end of the rotating shaft is arranged with a magnetic ring. One end of the motor casing is provided with an end cover. The center of the outer end surface of the end cover is provided with a groove. The magnetic ring is arranged inside the groove. A Hall induction device is arranged outside the groove and close to the magnetic ring. The motor is reasonably structured, compact, cost-effective, installation friendly, and highly reliable.

12 Claims, 10 Drawing Sheets

BRUSHLESS DC MOTOR HAVING STRUCTURES FOR MOUNTING A HALL ELEMENT AND A MAGNETIC RING OUTSIDE A MOTOR CASING

CROSS-REFERENCE TO RELATED APPLICATIONS

This application is a continuation-in-part of U.S. Ser. No. 13/283,631 filed on Oct. 28, 2011, now pending, which is based on Chinese Patent Application No. 201020595366.5 filed Oct. 30, 2010. The contents of all of these specifications are incorporated herein by reference.

BACKGROUND OF THE INVENTION

1. Field of the Invention

The invention relates to a brushless DC motor.

2. Description of the Related Art

Magnetic materials used in a rotor iron core of a high performance brushless DC motor are divided into two categories: one is weak magnetic ferrite or bonded rubidium iron boron while the other one is sintered rubidium iron boron made of strong magnetic materials. Disadvantages of above materials are as follows: 1) when weak magnetic ferrite or bonded rubidium iron boron are used in a rotor iron core, the motors, often having a Hall element and a magnetic ring inside, will have a large volume and consume large amounts of copper and iron. The cost will be relatively high; 2) when sintered rubidium iron boron made of strong magnetic materials are used for a rotor iron core, the magnetism will be extremely strong; if a Hall element and a magnetic ring are arranged inside a motor casing, the Hall element will suffer from great interference when sensing signals. Thus, the measurement accuracy will be affected leading to inaccurate or even unsuccessful control.

To solve above problems, some motor manufacturers arrange the Hall element and the magnetic ring outside the motor end cover, but following problems still exist: mounting structure layout of the Hall element and the magnetic ring is not reasonable, installation is unfriendly, reliability is poor, and cost is high.

SUMMARY OF THE INVENTION

In view of the above-described problems, it is one objective of the invention to provide a brushless DC motor with an external magnetic ring and Hall element that is reasonably structured, compact, cost-effective, installation friendly, and highly reliable.

To achieve the above objective, in accordance with one embodiment of the invention, there is provided a brushless DC motor comprising: a motor casing, a stator component, and a rotor component, wherein the stator component and the rotor component are respectively arranged inside the motor casing; the rotor component comprises a rotor iron core and a rotating shaft supporting the rotor iron core, a shaft extension end of the rotating shaft is arranged with a magnetic ring; one end of the motor casing is arranged with an end cover, the center of the outer end surface of the end cover is arranged with a groove; the magnetic ring is arranged inside the groove; a Hall induction device is arranged outside the groove and close to the magnetic ring.

In a class of this embodiment, the Hall induction device comprises a circuit board mounted with a Hall element and an installation kit, one end of the installation kit is connected with the circuit board and the other end supports the outer end of the end cover.

In a class of this embodiment, the installation kit is arranged with a plurality of uprights; the circuit board is disposed with a plurality of through holes, the through holes are fit together with the uprights.

In a class of this embodiment, the middle part of the installation kit is arranged with a convex ring body embedded in the groove; an outer edge surface of the convex ring body fits closely with a wall surface of the groove.

In a class of this embodiment, the outer side of the groove forms a cylinder body with an installation foot arranged outside; the installation foot is arranged with a screw hole; strip-shaped holes are arranged on corresponding upper and lower positions of the circuit board and the installation kit, respectively; screws passes through the strip-shaped holes and screw holes to connect the circuit board, the installation kit, and the installation feet together.

In a class of this embodiment, the strip-shaped holes are arc-shaped and concyclic.

In a class of this embodiment, inside the groove, the magnetic ring is mounted on the shaft extension end of the rotating shaft via a circular magnetic ring bracket; the magnetic ring is mounted on outer side of the magnetic ring bracket; a hollow shaft seat engaging with the rotating shaft is arranged in the middle of the magnetic ring bracket; an outer end of the hollow shaft seat is sheathed with an axial connecting seat and an outer end of the axial connecting seat is arranged with a locknut; the locknut locks the shaft extension end of the connecting rotating shaft and tightens the axial connecting seat.

In a class of this embodiment, three positioning holes are arranged on the inner wall surface of the convex ring body to accommodate the Hall element.

In a class of this embodiment, three spokes are arranged on top of the end cover and at outer side of the cylinder body.

In a class of this embodiment, the installation kit and the circuit board are bonded together to form a whole portion, and both the installation kit and the axial connecting seat are made of nylon and glass fiber materials.

In a class of this embodiment, the rotor iron core comprises an outer ring body, an inner ring body, and a plurality of ribs connecting the outer ring body and the inner ring body, the outer side of the outer ring body is mounted with a magnetic tile and the inner ring body is sleeved with the rotating shaft.

In a class of this embodiment, the outer side wall of the magnetic ring bracket is arranged with a positioning groove, the inner wall of the magnetic ring is arranged with a positioning convex portion engaging together with the positioning groove to enable the magnetic ring to be mounted outside the magnetic ring bracket.

In a class of this embodiment, a retaining ring is arranged at the end of the magnetic ring bracket and the bottom of the positioning groove to block the bottom of the positioning convex portion.

In a class of this embodiment, the end surface of the magnetic ring bracket is arranged with a buckle; a groove is arranged on the end surface of the magnetic ring; the buckle and the groove cooperate with each other to enable the magnetic ring bracket to axially hold the magnetic ring.

In a class of this embodiment, the inner wall of the central hole of the magnetic ring bracket is arranged with a flat surface, which is cooperatively positioned with a sliced plane of the rotating shaft.

Advantages of the invention are as follows.

1) One end of the motor casing is arranged with an end cover, the center of the outer end surface of the end cover is arranged with a groove with a magnetic ring arranged inside; a Hall induction device, close to the inductive magnetic ring, is also arranged outside the groove. Consequently it is reasonably structured, installation friendly, reliable, and cost-effective. Since the interference is low when magnetic field signals of the inductive magnetic ring of the Hall element changes, it ensures sensing accuracy and stability with low noise and effective control;

2) Since the Hall element is installed on the circuit board and arranged inside the positioning hole of and a number of strip-shaped holes are arc-shaped and concyclic, it ensures installation concentricity of the Hall elements, which is installation and commissioning friendly with high sensing precision;

3) The magnetic ring is mounted on the shaft extension end of the rotating shaft through the circular magnetic ring bracket, the magnetic ring is mounted on outer side of the magnetic ring bracket; a hollow shaft seat engaging with the rotating shaft is arranged in the middle of the magnetic ring bracket; outer end of the hollow shaft seat is sheathed with an axial connecting seat and outer end of the axial connecting seat is arranged with a locknut, which locks the shaft extension end of the connecting rotating shaft and tighten the axial connecting seat, thus the structure is compact and stable;

4) A rotor iron core is composed of an outer ring body, an inner ring body and several ribs connecting the outer ring body and the inner ring body, the outer side of the outer ring body is mounted with a magnetic tile, which is characterized in that it has a reasonable structure and saves materials and costs; and 5) The outer side wall of the magnetic ring bracket is arranged with a positioning groove, the inner wall of the magnetic ring is arranged with a positioning convex portion engaging the positioning groove so as to enable the magnetic ring to be mounted on outer side wall of the magnetic ring bracket; a retaining ring is arranged at the end of the magnetic ring bracket and the bottom of the positioning groove to block the bottom of the positioning convex portion; the end surface of the magnetic ring bracket is arranged with a buckle clamping the groove arranged on end surface of the magnetic ring so as to enable the magnetic ring bracket to axially hold the magnetic ring. The magnetic ring and the magnetic ring bracket can be simply and firmly installed with accurate positioning.

DETAILED DESCRIPTION OF THE EMBODIMENTS

This invention is explained in further detail below with the aid of the example embodiments and attached drawings.

As shown in FIGS. 1-4, a brushless DC motor comprises a motor casing 1, a stator component 2 and a rotor component 3 respectively arranged inside the motor casing 1. The rotor component 3 comprises a rotor iron core 4 and a rotating shaft 5 supporting the rotor iron core 4 and a shaft extension end of the rotating shaft 5 is arranged with a magnetic ring 6. One end of the motor casing 1 is arranged with an end cover 7, the center of the outer end surface of the end cover 7 is arranged with a groove 8 with the magnetic ring 6 arranged inside. A Hall induction device, close to the inductive magnetic ring 6, is also arranged outside the groove 8.

As shown in FIGS. 1-6, the Hall induction device comprises a circuit board 9 mounted with a Hall element and an installation kit 10, one end of the installation kit 10 is connected with the circuit board 9 and the other end supports the outer end of the end cover 7. The installation kit 10 is arranged with a plurality of uprights 11. The circuit board 9 is disposed with a plurality of through holes 12. The through holes 12 fit together with the uprights 11. The middle part of the installation kit 10 is arranged with a convex ring body 13, which is embedded in the groove 8. The outer edge surface of the convex ring body 13 fit closely with the wall surface of the groove 8. The outer side of the groove 8 forms a cylinder body 14. An installation foot 15 is arranged outside the cylinder body 14. The installation foot 15 is arranged with a screw hole 16. Strip-shaped holes 18 are arranged on corresponding upper and lower positions of the circuit board 9 and the installation kit 10, respectively. The screws 19 passes through the strip-shaped hole 18 and the screw hole 16 to connect the circuit board 9, the installation kit 10, and the installation feet 15 together. The strip-shaped holes 18 are arc-shaped and concyclic. Inside the groove 8, the magnetic ring 6 is mounted on the shaft extension end of the rotating shaft 5 through the circular magnetic ring bracket 20. The magnetic ring 6 is mounted on the outer side of the magnetic ring bracket 20. The middle of the magnetic ring bracket 20 is arranged with a hollow shaft seat 21 engaging with the rotating shaft 5. The outer end of the hollow shaft seat 21 is arranged with an axial connecting seat 22, the outer end of the axial connecting seat 22 is arranged with a locknut 23, which locks the shaft extension end of the connecting rotating shaft 5 and tighten the axial connecting seat 22. Three positioning holes 24 are arranged on inner wall surface of the convex ring body 13 to accommodate the Hall element. Three spokes 25 are arranged on top of the end cover 7 and outer side of the cylinder body 14.

Figure 1:
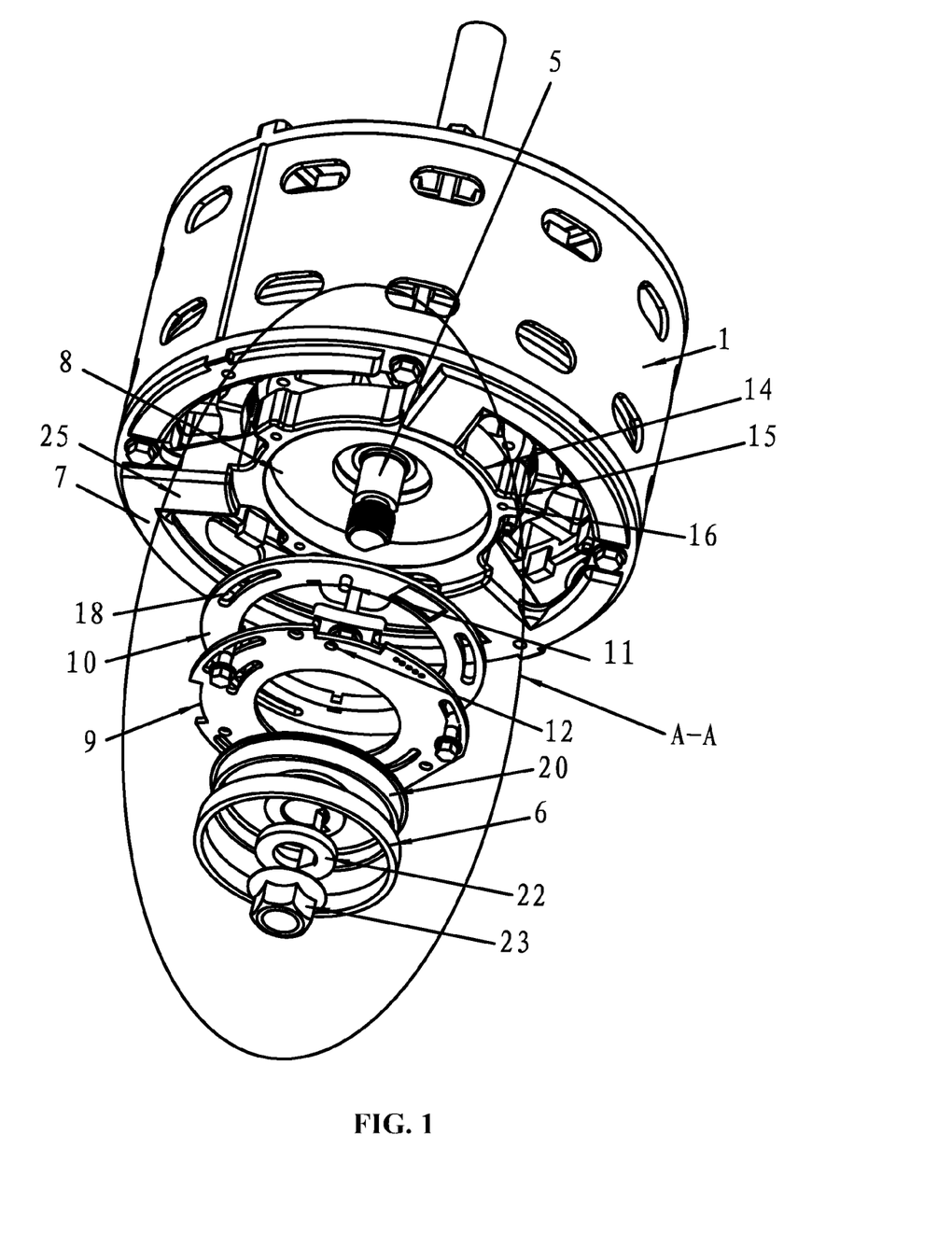
FIG. 1 is a partial exploded view of a brushless DC motor according to one embodiment of the invention.
Figure 2:
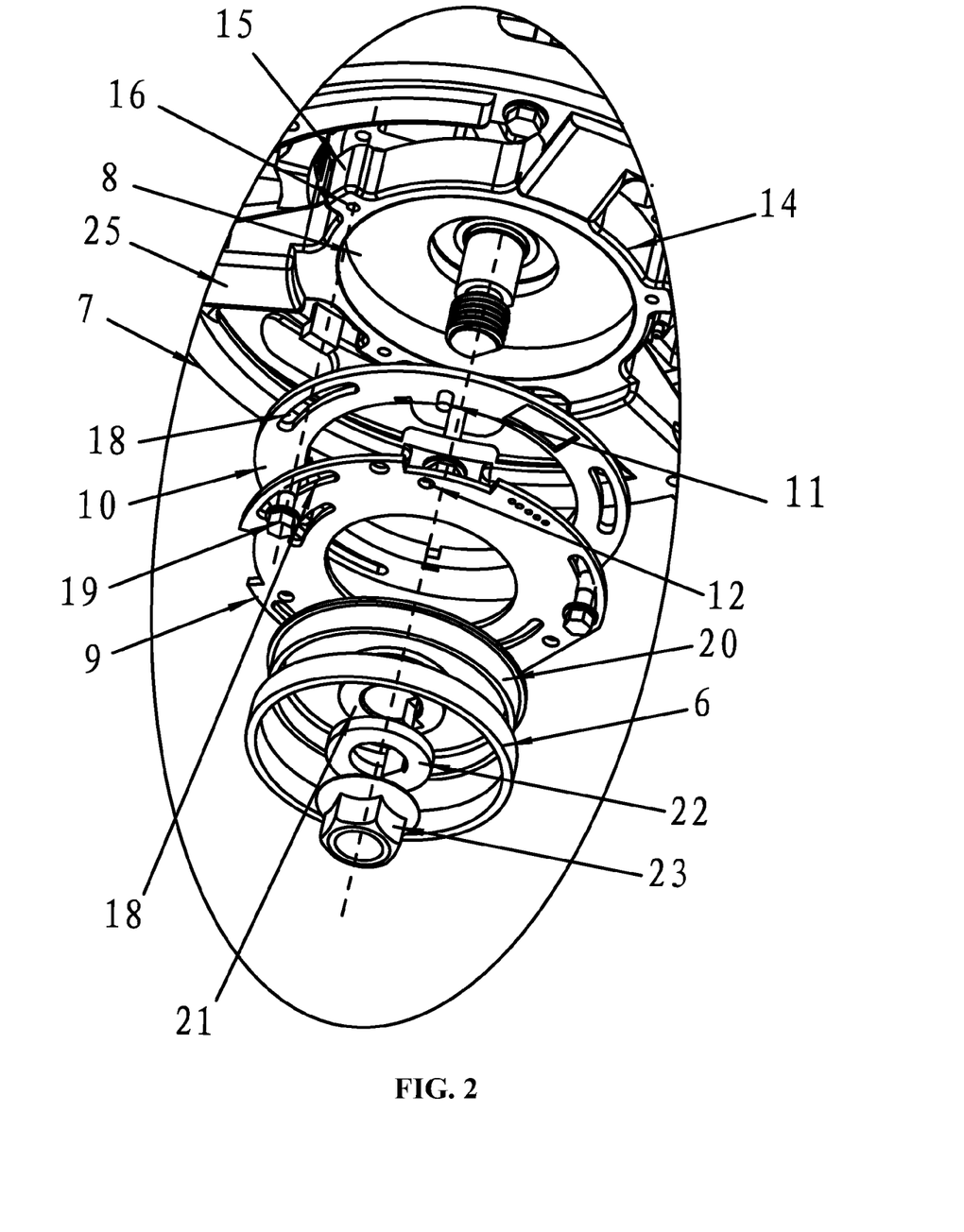
FIG. 2 is an A-A enlarged view of FIG. 1.
Figure 3:
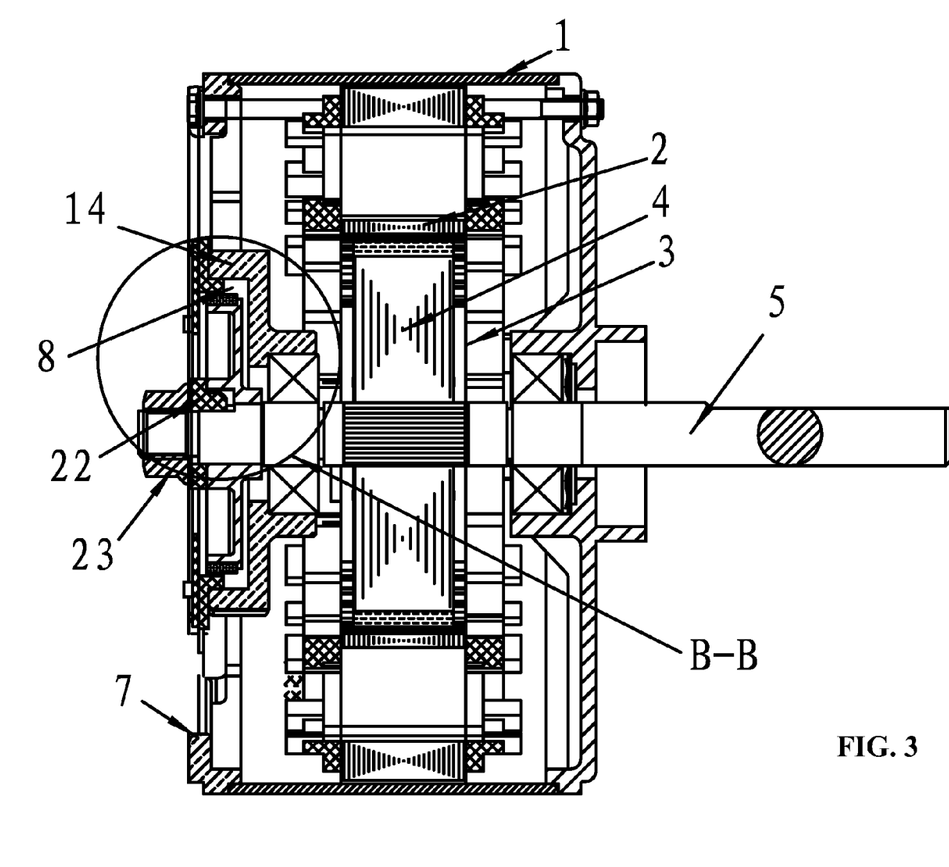
FIG. 3 is an inner structural diagram of a brushless DC motor according to one embodiment of the invention.
Figure 4:
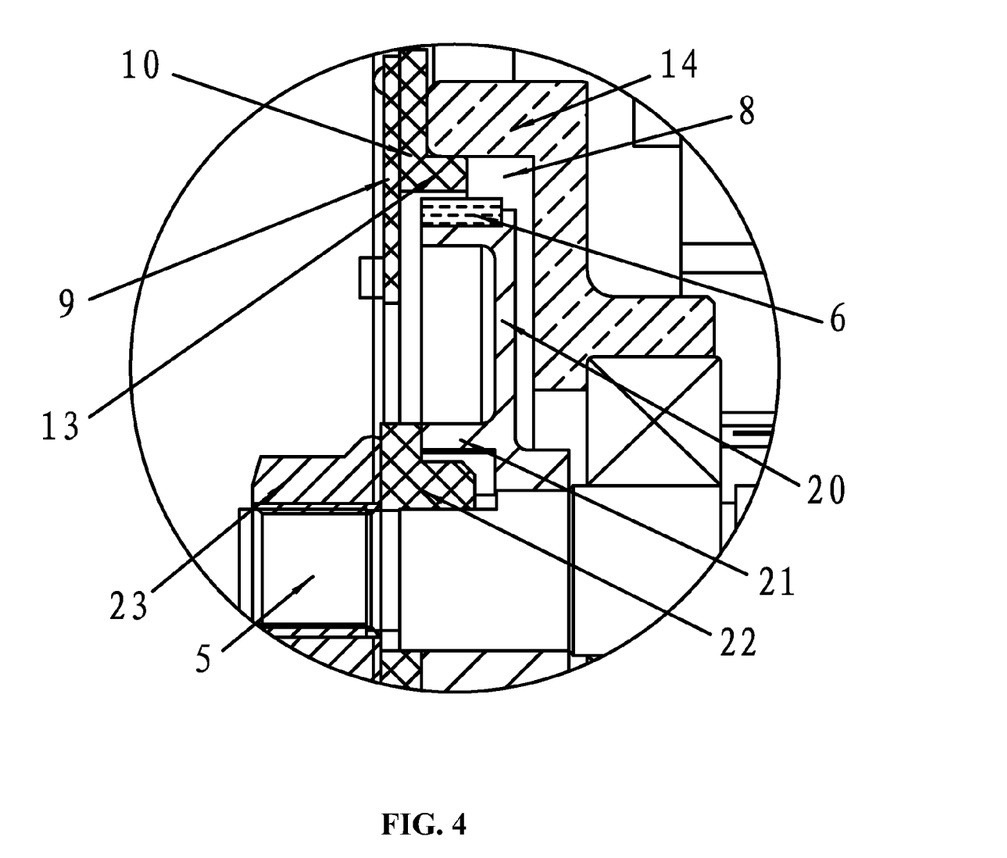
FIG. 4 is a B-B enlarged view of FIG. 3.
Figure 5:
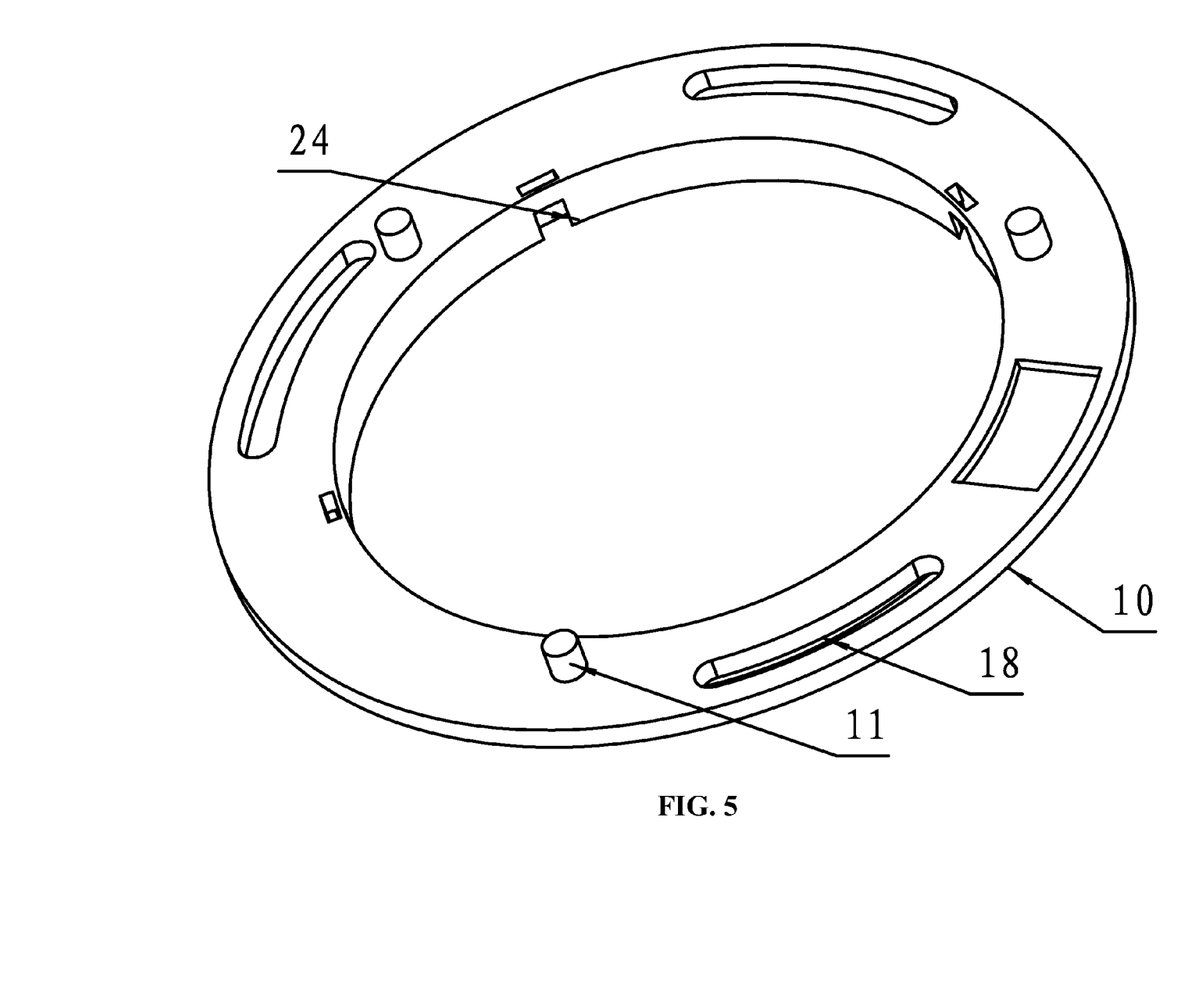
FIG. 5 is a front three-dimensional diagram of an installation kit of a Hall induction device according to one embodiment of the invention.
Figure 6:
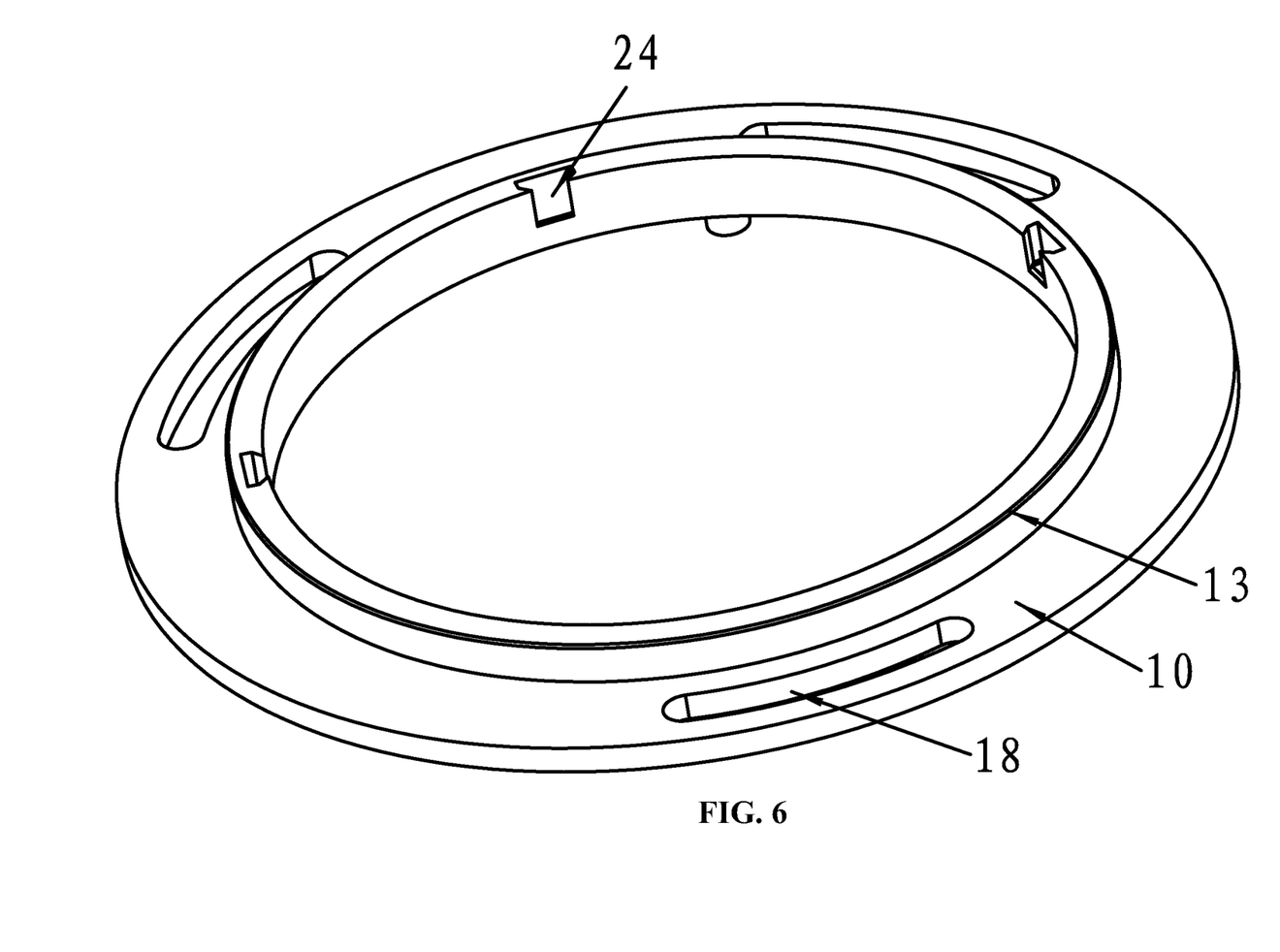
FIG. 6 is an opposite three-dimensional diagram of an installation kit of a Hall induction device according to one embodiment of the invention.
Figure 7:
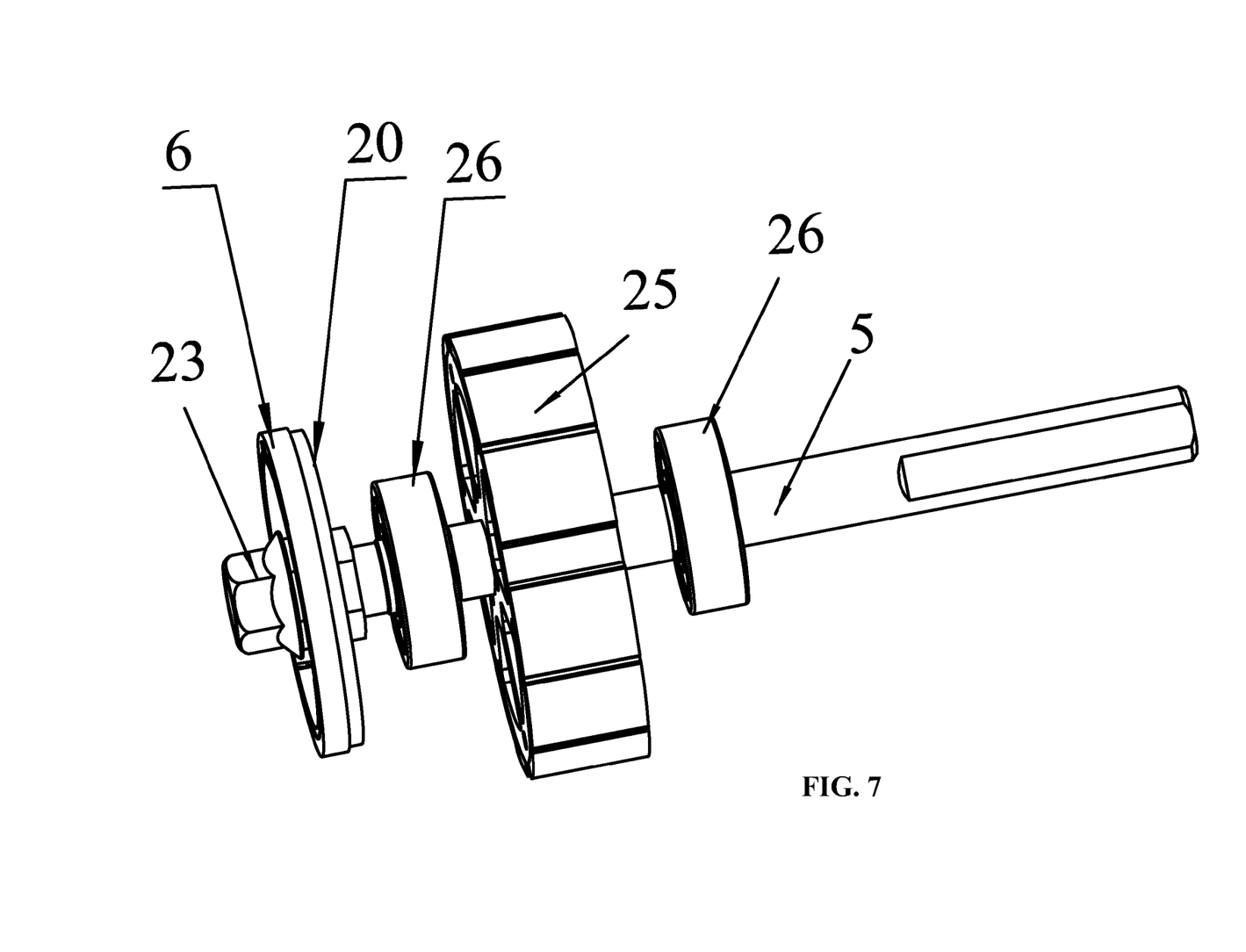
FIG. 7 is a three-dimensional diagram of a rotor component according to one embodiment of the invention.
Figure 8:
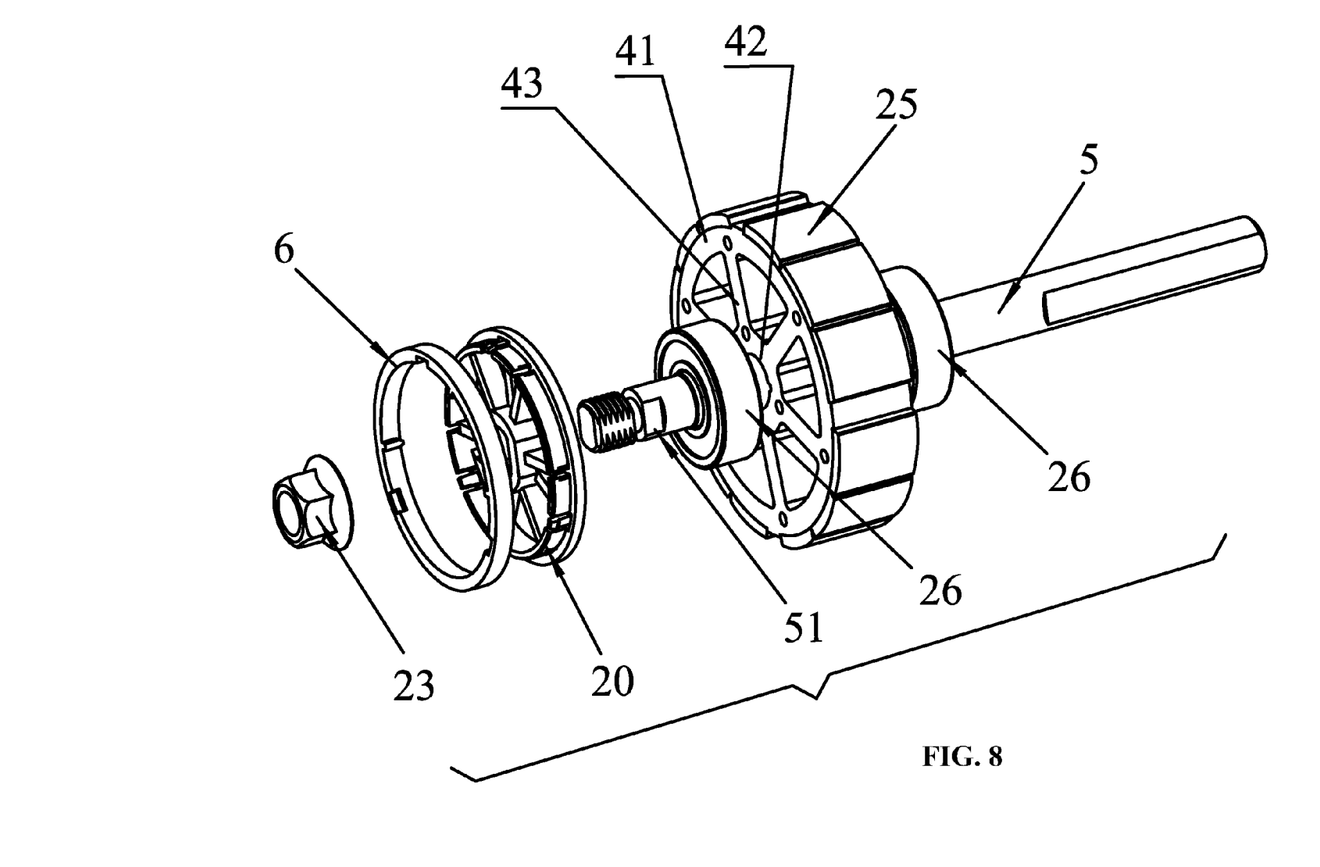
FIG. 8 is an exploded view of a rotor component according to one embodiment of the invention.
Figure 9:
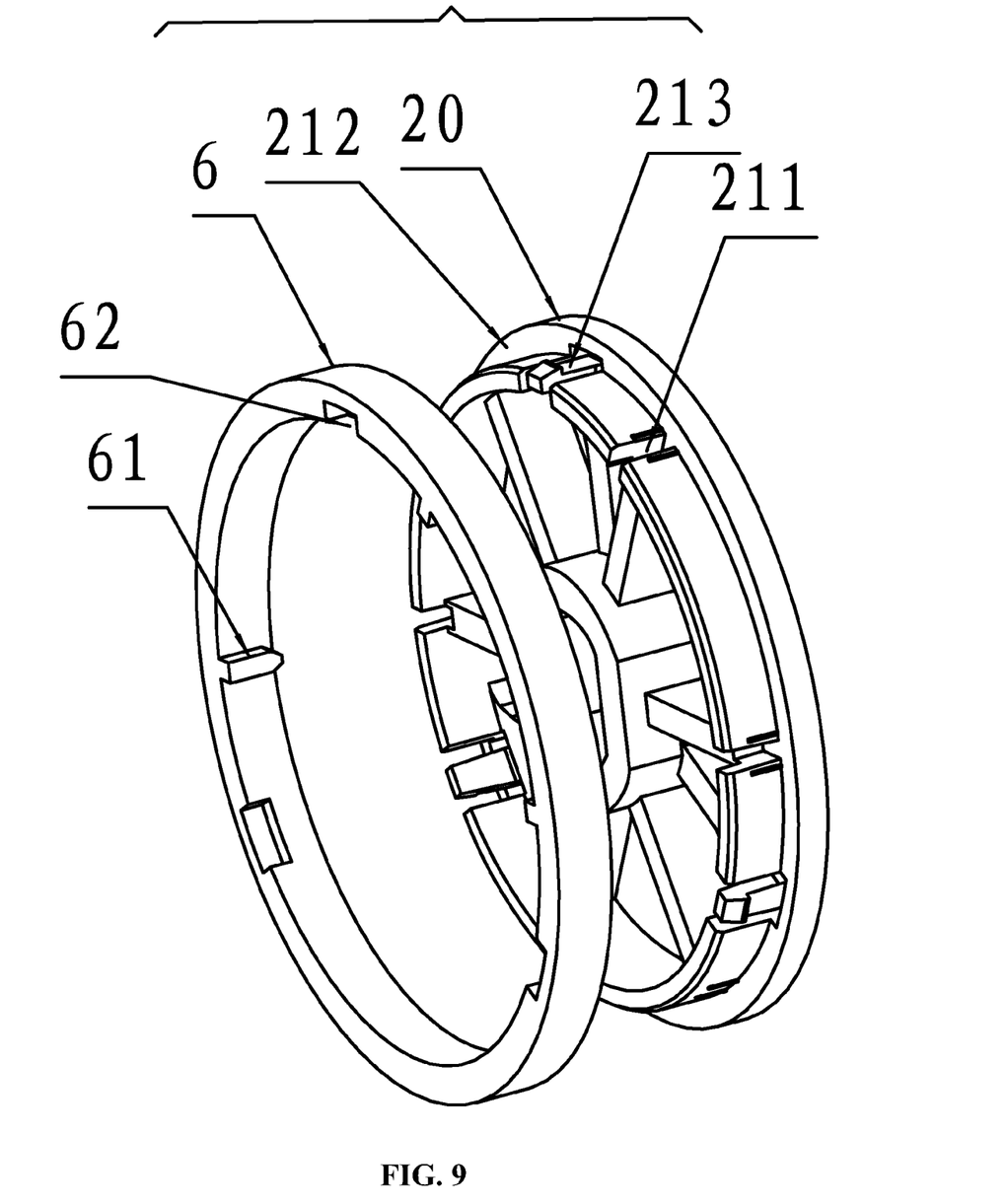
FIG. 9 is an installation diagram of a magnetic ring and a magnetic ring bracket according to one embodiment of the invention.
Figure 10:
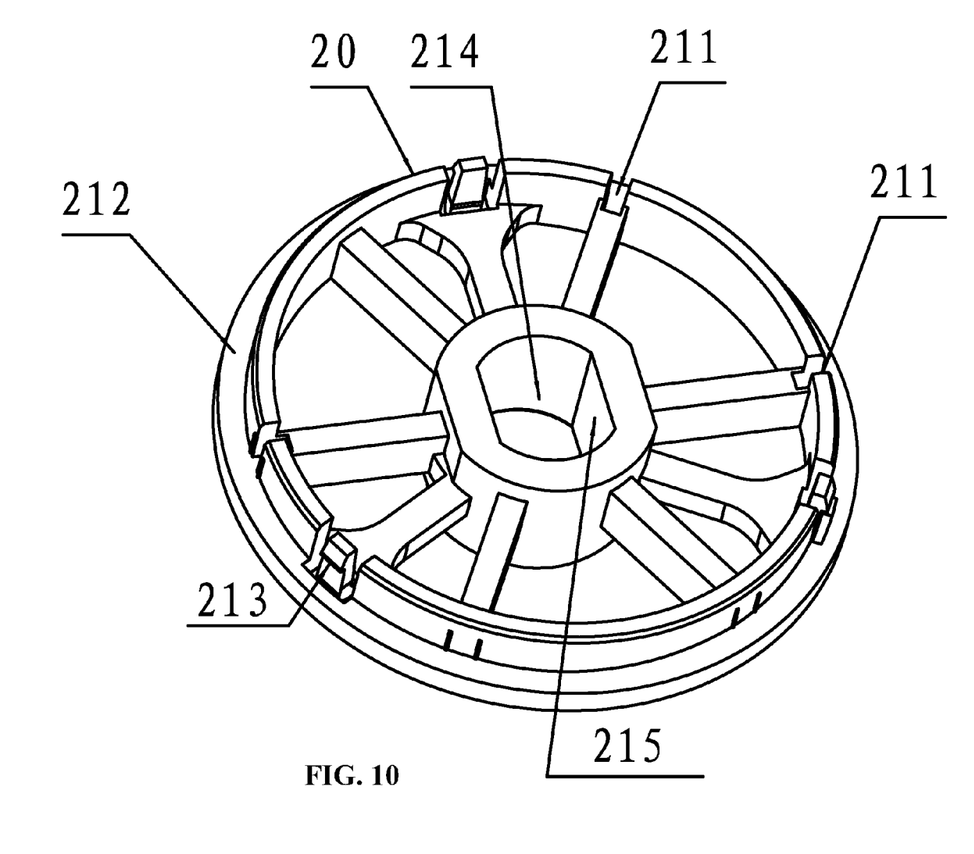
FIG. 10 is a three-dimensional diagram of a magnetic ring bracket according to one embodiment of the invention.

The installation kit 10 and circuit board 9 are bonded together to form a whole portion, and both the installation kit 10 and axial connecting seat 22 are made of nylon and glass fiber materials.

As shown in FIGS. 7-10, the rotor iron core 4 comprises an outer ring body 41, an inner ring body 42 and a plurality of ribs 43 connecting the outer ring body 41 and the inner ring body 42. The outer side surface of the outer ring body 41 is mounted with a magnetic tile 25 and the inner ring body 42 is sleeved on the rotating shaft 5. The outside wall of the magnetic ring bracket 20 is arranged with a positioning groove 211. The inner wall of the magnetic ring 6 is arranged with a positioning convex portion 61 engaging with the positioning groove 211 so as to enable the magnetic ring 6 to be mounted outside of the magnetic ring bracket 20. A retaining ring 212 is arranged at the end of the magnetic ring bracket 20 and the bottom of the positioning groove 211 and the retaining ring 212 blocks the bottom of the positioning convex portion 61. The end surface of the magnetic ring bracket 20 is arranged with a buckle 213. A groove 62 is arranged on the end surface of the magnetic ring 6. The buckle and the groove cooperate with each other to enable the magnetic ring bracket 20 to axially hold the magnetic ring 6. The inner wall of the central hole 214 of the magnetic ring bracket 20 is arranged with a flat surface 215, which is cooperatively positioned with a sliced plane 51 of the rotating shaft 5.

The principle of the invention is summarized below: the motor casing is arranged with an external magnetic ring and a Hall element, which is characterized in that it is reasonably structured, compact, cost-effective, installation friendly, and highly reliable. Since the interference is low when magnetic field signals of the inductive magnetic ring of the Hall element changes, it ensures sensing accuracy and stability with low noise and effective control.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A brushless DC motor, comprising:
   a) a motor casing;
   b) a stator component; and
   c) a rotor component;
wherein:
   the stator component and the rotor component are respectively arranged inside the motor casing;
   the rotor component comprises a rotor iron core and a rotating shaft supporting the rotor iron core, and a shaft extension end of the rotating shaft is arranged with a magnetic ring;
   one end of the motor casing is arranged with an end cover;
   a center of an outer end surface of the end cover is arranged with a groove;
   the magnetic ring is arranged inside the groove;
   a Hall induction device is arranged outside the groove and close to the magnetic ring;
   the Hall induction device comprises a circuit board mounted with a Hall element and an installation kit, one end of the installation kit is connected with the circuit board and the other end supports the outer end of the end cover;
   the installation kit is arranged with a plurality of uprights; the circuit board is disposed with a plurality of through holes; the through holes are fit together with the uprights;
   a middle part of the installation kit is arranged with a convex ring body embedded into the groove; an outer edge surface of the convex ring body fits closely with a wall surface of the groove; and
   an outer side of the groove forms a cylinder body with an installation foot arranged outside; the installation foot is arranged with a screw hole; strip-shaped holes are arranged on corresponding upper and lower positions of the circuit board and the installation kit, respectively; screws passes through the strip-shaped holes and screw holes to connect the circuit board, the installation kit, and the installation feet together.

2. The motor of claim 1, A brushless DC motor, comprising:
   a) a motor casing;
   b) a stator component; and
   c) a rotor component;
wherein:
   the stator component and the rotor component are respectively arranged inside the motor casing;
   the rotor component comprises a rotor iron core and a rotating shaft supporting the rotor iron core, and a shaft extension end of the rotating shaft is arranged with a magnetic ring;
   one end of the motor casing is arranged with an end cover;
   a center of an outer end surface of the end cover is arranged with a groove;
   the magnetic ring is arranged inside the groove;
   a Hall induction device is arranged outside the groove and close to the magnetic ring;
   inside the groove, the magnetic ring is mounted on the shaft extension end of the rotating shaft via a circular magnetic ring bracket;
   the magnetic ring is mounted on an outer side of the magnetic ring bracket;
   a hollow shaft seat engaging with the rotating shaft is arranged in the middle of the magnetic ring bracket;
   an outer end of the hollow shaft seat is sheathed with an axial connecting seat;
   an outer end of the axial connecting seat is arranged with a locknut; and
   the locknut locks the shaft extension end of the connecting rotating shaft and tightens the axial connecting seat.

3. The motor of claim 1, wherein
   inside the groove, the magnetic ring is mounted on the shaft extension end of the rotating shaft via a circular magnetic ring bracket;
   the magnetic ring is mounted on an outer side of the magnetic ring bracket;
   a hollow shaft seat engaging with the rotating shaft is arranged in the middle of the magnetic ring bracket;
   an outer end of the hollow shaft seat is sheathed with an axial connecting seat;
   an outer end of the axial connecting seat is arranged with a locknut; and
   the locknut locks the shaft extension end of the connecting rotating shaft and tightens the axial connecting seat.

4. The motor of claim 1, wherein three positioning holes are arranged on the inner wall surface of the convex ring body to accommodate the Hall element.

5. The motor of claim 1, wherein the rotor iron core comprises an outer ring body, an inner ring body, and a plurality of ribs connecting the outer ring body and the inner ring body; an outer side of the outer ring body is mounted with a magnetic tile and the inner ring body is sleeved with the rotating shaft.

6. The motor of claim 2, wherein the outer side wall of the magnetic ring bracket is arranged with a positioning groove; the inner wall of the magnetic ring is arranged with a positioning convex portion engaging together with the positioning groove to enable the magnetic ring to be mounted outside the magnetic ring bracket.

7. The motor of claim 3, wherein the outer side wall of the magnetic ring bracket is arranged with a positioning groove; the inner wall of the magnetic ring is arranged with a positioning convex portion engaging together with the positioning groove to enable the magnetic ring to be mounted outside the magnetic ring bracket.

8. The motor of claim 6, wherein a retaining ring is arranged at the end of the magnetic ring bracket and the bottom of the positioning groove to block the bottom of the positioning convex portion.

9. The motor of claim 7, wherein a retaining ring is arranged at the end of the magnetic ring bracket and the bottom of the positioning groove to block the bottom of the positioning convex portion.

10. The motor of claim 8, wherein the end surface of the magnetic ring bracket is arranged with a buckle; a groove is arranged on the end surface of the magnetic ring; the buckle and the groove cooperate with each other to enable the magnetic ring bracket to axially hold the magnetic ring.

11. The motor of claim 9, wherein the end surface of the magnetic ring bracket is arranged with a buckle; a groove is arranged on the end surface of the magnetic ring; the buckle and the groove cooperate with each other to enable the magnetic ring bracket to axially hold the magnetic ring.

12. The motor of claim 1, wherein an inner wall of a central hole of the magnetic ring bracket is arranged with a flat surface and the flat surface is cooperatively positioned with a sliced plane of the rotating shaft.

\* \* \* \* \*